(12) United States Patent
Eichenauer

(10) Patent No.: US 6,384,133 B1
(45) Date of Patent: May 7, 2002

(54) ABS-MOULDING COMPOUNDS WITH AN IMPROVED COMBINATION OF PROPERTIES

(75) Inventor: Herbert Eichenauer, Dormagen (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 09/831,853

(22) PCT Filed: Nov. 4, 1999

(86) PCT No.: PCT/EP99/08413

§ 371 Date: May 15, 2001

§ 102(e) Date: May 15, 2001

(87) PCT Pub. No.: WO00/29458

PCT Pub. Date: May 25, 2000

(30) Foreign Application Priority Data

Nov. 18, 1998 (DE) ......................... 198 53 107

(51) Int. Cl.$^7$ .............................................. C08L 55/02
(52) U.S. Cl. ............................. 525/64; 525/67; 525/68; 525/69; 525/71
(58) Field of Search ............................. 525/64, 66, 67, 525/68, 69, 71

(56) References Cited

U.S. PATENT DOCUMENTS

| | | |
|---|---|---|
| 4,009,226 A | 2/1977 | Ott et al. |
| 4,009,227 A | 2/1977 | Ott et al. |
| 4,430,478 A | 2/1984 | Schmitt et al. ............... 525/71 |
| 4,713,420 A | 12/1987 | Henton ....................... 525/236 |
| 5,008,331 A | 4/1991 | Kawashima et al. .......... 525/84 |
| 5,200,441 A | 4/1993 | Kim et al. .................. 523/221 |
| 5,352,728 A | 10/1994 | Kim et al. .................. 524/501 |
| 5,741,853 A | 4/1998 | Eichenauer et al. .......... 525/71 |

FOREIGN PATENT DOCUMENTS

| | | |
|---|---|---|
| DE | 41 13 326 | 10/1992 |
| EP | 0 418 042 | 3/1991 |
| EP | 0 678 531 | 10/1995 |

OTHER PUBLICATIONS

Database WPI, Section Ch, Week 199346, Derwent Publications Ltd., London, GB; AN 1993–365290, XP002133668 & JP 05 271360 A (Mitsui Toatsu Chem. Inc.) Oct. 19, 1993.

*Primary Examiner*—Jeffrey Mullis
(74) *Attorney, Agent, or Firm*—Joseph C. Gil; Aron Preis

(57) ABSTRACT

A thermoplastic molding composition having improved mechanical properties is disclosed. The ABS composition that comprise a graft rubber polymer obtained by emulsion polymerization in the presence of specifically defined butadiene polymer latices and a rubber-free copolymer is suitable for making molded articles.

8 Claims, No Drawings

ABS-MOULDING COMPOUNDS WITH AN IMPROVED COMBINATION OF PROPERTIES

ABS moulding compositions have now been used for many years and in large amounts as thermoplastic resins for producing moulded items of all types. The range of properties of these resins can be varied within wide limits.

ABS polymers which are characterised by a combination of good values for the key properties toughness (in particular at low temperature), hardness (i.e. the E-modulus), processability and surface gloss are of particular interest.

When using the emulsion polymerisation process, these types of products are generally prepared by the joint use of different graft rubber components in a thermoplastic resin matrix.

Thus, for instance, DE-OS 24 20 357 and DE-OS 24 20 358 describe thermoplastic moulding compositions of the ABS type with high toughness, high surface gloss and ready processability resulting from a combination of a coarsely divided graft rubber and a finely divided graft rubber, wherein the ratios by weight of styrene to acrylonitrile in the graft rubbers and in the matrix resin have to assume specific values.

EP-A 470 229, EP-A 473 400 and WO 91/13118 disclose the production of an impact resistant, high-gloss, thermoplastic resin by combining a graft polymer with a low rubber content and a small particle diameter with a graft polymer with a high rubber content and a large particle diameter.

DE-OS 4113 326 discloses thermoplastic moulding compositions with two different graft products, wherein the rubber content of each of the graft rubbers is a maximum of 30 wt. %.

For all the moulding compositions described here, at least two separately prepared graft rubber polymers are required to produce the desired properties. This means that optimisation of the graft reaction conditions, graft polymerisation reactions, working-up, etc. has to be performed separately for each graft rubber. In addition, in general at least one of the graft rubber components required has to have a low rubber content, i.e. a relatively high proportion of the graft rubber polymer which is costly to produce has to be used. In many cases, however, the requisite degree of reliability when adjusting the desired combination of properties is not produced.

Attempts to synthesise graft rubbers for producing improved ABS products have also been made by using mixtures of two rubber latices as the graft substrate.

Thus, EP-A 288 298 describes the preparation of products with a finely divided and a coarsely divided rubber latex as graft substrates, wherein however only graft rubbers with low rubber contents of about 40% are described. The thermoplastic resins prepared from these do not exhibit satisfactory processability due to poor thermoplastic flow characteristics; in addition, resin components with high acrylonitrile content have to be used, which usually leads to discoloration of the ABS products.

EP-A 745 624 describes the use of a mixture of two rubber latices with defined widths of particle size distributions for preparing ABS moulding compositions which do not darken in colour for producing moulded parts with a ribbed structure. However, these products lead to unsatisfactory low temperature toughness and in particular to a poor relationship between toughness and thermoplastic processability (flow characteristics).

The object therefore arose of providing thermoplastic moulding compositions of the ABS type which can be prepared by using only a single graft rubber polymer, wherein the combination of high toughness, high hardness or E-modulus, high surface gloss and in particular very good thermoplastic processability mentioned above can be reliably adjusted. In addition, the graft rubber polymer used should have a rubber content of greater than 50 wt. %, preferably greater than. 55 wt. %.

The invention therefore provides ABS moulding compositions containing

I) a graft rubber polymer which is obtainable by emulsion polymerisation of styrene and acrylonitrile in the ratio by weight of 90:10 to 50:50, wherein styrene and/or acrylonitrile may be entirely or partly, replaced by α-methylstyrene, methyl methacrylate or N-phenylmaleic imide, in the presence of a mixture of a butadiene polymer latex (A) with an average particle diameter $d_{50} \leq 230$ nm, preferably 150 to 220 nm, particularly preferably 170 to 215 nm and very particularly preferably 175 to 200 nm, and a gel content of 40 to 95 wt. %, preferably 50 to 90 wt. % and particularly preferably 60 to 85 wt. %, a butadiene polymer latex (B) with an average particle diameter $d_{50}$ of 250 to 330 mn, preferably 260 to 320 nm and particularly preferably 270 to 310 nm and a gel content of 35 to 75 wt. %, preferably 40 to 70 wt. % and particularly preferably 45 to 60 wt. % and a butadiene polymer latex (C) with an average particle diameter $d_{50} \geq 350$ nm, preferably 370 to 450 nm, particularly preferably 375 to 430 nm and very particularly preferably 380 nm to 425 nm and a gel content of 60 to 90 wt. %, preferably 65 to 85 wt. % and particularly preferably 70 to 80 wt. %, wherein the butadiene polymer latices each contain 0 to 50 wt. % of another copolymerised vinyl monomer and wherein the ratio by weight of the graft monomers used to the butadiene polymers used is 10:90 to 60:40, preferably 20:80 to 50:50 and particularly preferably 25:75 to 45:55, and II) at least one rubber-free copolymer of styrene and acrylonitrile in the ratio by weight of 90:10 to 50:50, wherein styrene and/or acrylonitrile may be entirely or partly replaced by a-methylstyrene, methyl methacrylate or N-phenylmaleic imide.

When preparing graft rubber polymer (I), the butadiene polymer latices (A), (B) and (C) are preferably used in the proportions 10 to 40 wt. %, preferably 20 to 37.5 wt. % and particularly preferably 22.5 to 35 wt. % of (A), 10 to 70 wt. %, preferably 20 to 65 wt. % and particularly preferably 30 to 60 wt. % of (13) and 5 to 50 wt. %, preferably 7.5 to 45 wt. % and particularly preferably 10 to 40 wt. % of (C) (each with respect to the particular solids content of the latices).

Another preferred group, when preparing graft rubber polymer (I), is the use of the butadiene polymer latices (A), (B) and (C) in the proportions 10 to 40 wt. %, preferably 20 to 37.5 wt. % and particularly preferably 22.5 to 35 wt. % of (A), 30 to 70 wt. %, preferably 35 to 65 wt. % and particularly preferably 40 to 60 wt. % of (B) and 5 to 45 wt. %, preferably 7.5 to 40 wt. % and particularly preferably 10 to 35 wt. % of (C) (each with respect to the particular solids content of the latices).

In particular, butadiene polymer latices (A), (B) and (C) are used in amounts such that the equations $B \leq A+C$, $B>A$ and $B>C$ are satisfied for the amounts of rubber.

In general, moulding compositions according to the invention may contain 1 to 60 parts by wt., preferably 5 to 50 parts by wt. of (I) and 40 to 99 parts by wt., preferably 50 to 95 parts by wt. of (II).

In addition, moulding compositions according to the invention may contain other rubber-free thermoplastic resins which are not built up from vinyl monomers, wherein these thermoplastic resins are used in amounts of up to 500 parts by wt., preferably up to 400 parts by wt. and particularly preferably up to 300 parts by wt. (each with respect to 100 parts by wt. of I+II).

Butadiene polymer latices (A), (B) and (C) may be prepared by the emulsion polymerisation of butadiene. This polymerisation process is known and is described, for example, in Houben-Weyl, Methoden der Organischen Chemie, Makromolekulare Stoffe, part 1, p. 674 (1961), Thieme Verlag Stuttgart. Up to 50 wt. %, preferably up to 30 wt. % (with respect to the total amount of monomers used to prepare the butadiene polymer) of one or more monomers which can copolymerise with butadiene may be used as comonomers.

Examples of these monomers are isoprene, chloroprene, acrylonitrile, styrene, α-methylstyrene, $C_1$–$C_4$-alkylstyrenes, $C_1$–$C_8$-alkyl acrylates, $C_1$–$C_8$-alkyl methacrylates, alkylene glycol diacrylates, alkylene glycol dimethacrylates, divinylbenzene; butadiene alone is preferably used. During the preparation of (A), (B) and (C), it is also possible, according to known methods, initially to prepare a finely divided butadiene polymer and then to agglomerate this in a known manner to adjust the particle diameter required.

Relevant techniques have been described (see EP-B 0 029 613;.EP-B 0 007 810; DD-patent 144 415; DE-AS 1 233 131; DE-AS 1 258 076; DE-OS 2 101 650; U.S. Pat. No. 1,379,391).

Similarly, the so-called seed polymerisation technique may also be used, in which a finely divided butadiene polymer is first prepared and then further polymerised by further reaction with monomers which contain butadiene in order to produce larger particles.

In principle, butadiene polymer latices (A), (B) and (C) may also be prepared by emulsifying finely divided butadiene polymers in aqueous media (see Japanese patent application 55 125 102).

Butadiene polymer latex (A) has an average particle diameter $d_{50} \leq 230$ nm, preferably 150 to 220 nm, particularly preferably 170 to 215 nm and very particularly preferably 175 to 200 nm, and a gel content of 40 to 95 wt. %, preferably 50 to 90 wt. % and particularly preferably 60 to 85 wt. %.

Butadiene polymer latex (B) has an average particle diameter $d_{50}$ of 250 to 330 nm, preferably 260 to 320 nm and particularly preferably 270 to 310 nm and a gel content of 35 to 75 wt. %, preferably 40 to 70 wt. % and particularly preferably 45 to 60 wt. %.

Butadiene polymer latex (C) has an average particle diameter $d_{50} \geq 350$ nm, preferably 370 to 450 nm, particularly preferably 375 to 430 nm and very particularly preferably 380 nm to 425 nm and a gel content of 60 to 90 wt. %, preferably 65 to 85 wt. % and particularly preferably 70 to 80 wt. %.

The average particle diameter $d_{50}$ can be determined by ultracentrifuge measurement (see W. Scholtan, H. Lange: Kolloid Z. u Z. Polymere 250, p. 782–796 (1972)). The values given, for gel content refer to determination by the wire cage method in toluene (see Houben-Weyl Methoden der Organischen Chemie, Makromolekulare Stoffe, part 1, p. 307 (1961), Thieme Verlag Stuttgart).

The gel contents of butadiene polymer latices (A), (B) and (C) can in principle be adjusted in a known way by the use of appropriate reaction conditions (for example, a high reaction temperature and/or polymerisation to a high conversion and optionally the addition of cross-linking substances to produce a high gel content or, for example, a low reaction temperature and/or terminating the polymerisation reaction before the occurrence of too great a degree of cross-linking and optionally the addition of molecular weight regulators such as, for example, n-dodecyl mercaptan or t-dodecyl mercaptan, to produce a low gel content). Conventional anionic emulsifiers such as alkyl sulfates, allyl sulfonates, aralkyl sulfonates, soaps of saturated or unsaturated fatty acids and alkaline disproportionated or hydrogenated abietic or tall oil acids may be used as emulsifiers; emulsifiers with carboxyl groups (e.g. salts of $C_{10}$–$C_{18}$ fatty acids, disproportionated abietic acid) are preferably used.

Graft polymerisation during the preparation of graft polymer I) may be performed so that the monomer mixture is added continuously to the mixture of butadiene polymer latices (A), (B) and (C) and polymerised.

Specific monomer/rubber ratios are preferably maintained during this process and the monomers are added to the rubber latex in a known way.

To produce component I) according to the invention, preferably 15 to 50 parts by wt., particularly preferably 20 to 40 parts by wt. of a mixture of styrene and acrylonitrile, which may optionally contain up to 50 wt. % (with respect to the total amount of monomers used in the graft polymerisation process) of one or more comonomers, are polymerised in the presence of preferably 50 to 85 parts by wt., particularly preferably 60 to 80 parts by wt. (each with respect to solids) of the butadiene polymer latex mixture of (A), (B) and (C).

The monomers used during graft polymerisation are preferably mixtures of styrene and acrylonitrile in a ratio by weight of 90:10 to 50:50, particularly preferably in the ratio by weight of 65:35 to 75:25, wherein styrene and/or acrylonitrile may be replaced entirely or partly by copolymerisable monomers, preferably by α-methylstyrene, methyl methacrylate or N-phenylmaleic imide.

In addition, molecular weight regulators may be used during graft polymerisation, preferably in amounts of 0.05 to 2 wt. %, particularly preferably in amounts of 0.1 to 1 wt. % (each with respect to the total amount of monomers in the graft polymerisation stage).

Suitable molecular weight regulators are, for example, alkyl mercaptans such as n-dodecyl mercaptan, t-dodecyl mercaptan; dimeric α-methylstyrene; terpinolene.

Suitable initiators are inorganic and organic peroxides, for example $H_2O_2$, di-tert.-butyl peroxide, cumene hydroperoxide, dicyclohexyl percarbonate, tert.-butyl hydroperoxide, p-menthane hydroperoxide, azoinitiators such as azoisobutyronitrile, inorganic per-salts such as ammonium, sodium or potassium persulfate, potassium perphosphate, sodium perborate and redox systems. Redox systems generally consist of an organic oxidising agent and a reducing agent, wherein heavy metal ions may also be present in the reaction medium (see Houben-Weyl, Methoden der Organischen Chemie, vol. 14/1, p. 263–297).

The polymerisation temperature is 25° C. to 160° C., preferably 40° C. to 90° C. Suitable emulsifiers have been mentioned above.

To produce component I) according to the invention, graft polymerisation may preferably be performed by introducing the monomers in such a way that 55 to 90 wt. %, preferably 60 to 80 wt. % and particularly preferably 65 to 75 wt. % of the total amount of monomers being used for graft polymerisation are added during the first half of the total monomer addition time; the remaining proportion of monomers is added during the second half of the total monomer addition time.

Rubber-free copolymers II) which are used are preferably copolymers of styrene and acrylonitrile in the ratio by weight of 90:10 to 50:50, wherein styrene and/or acrylonitrile may be replaced entirely or partly by α-methylstyrene, methyl methacrylate or N-phenylmaleic imide.

Copolymers II) containing proportions of copolymerised acrylonitrile units of <30 wt. %, are particularly preferable.

These copolymers preferably have average molecular weights $\overline{M}_w$ of 20,000 to 200,000 and intrinsic viscosities [η] of 20 to 110 ml/g (measured in dimethylformamide at 25° C.).

The details for preparing these resins are described, for example, in DE-AS 2 420 358 and DE-AS 2 724 360. Vinyl resins prepared by bulk or solution polymerisation have proven especially advantageous. The copolymers may be added individually or in any mixture.

Apart from thermoplastic resins built up from vinyl monomers, the use of polycondensates, e.g. aromatic polycarbonates, aromatic polyestercarbonates, polyesters or polyamides as rubber-free copolymers is also possible in moulding compositions according to the invention.

Suitable thermoplastic polycarbonates and polyestercarbonates are known (see e.g. DE-AS 1 495 626, DE-OS 2 232 877, DE-OS 2 703 376, DE-OS 2 714 544, DE-OS 3 000 610, DE-OS 3 832 396, DE-OS 3 077 934), and can be prepared, for example, by reacting diphenols of the formulae (I) and (II)

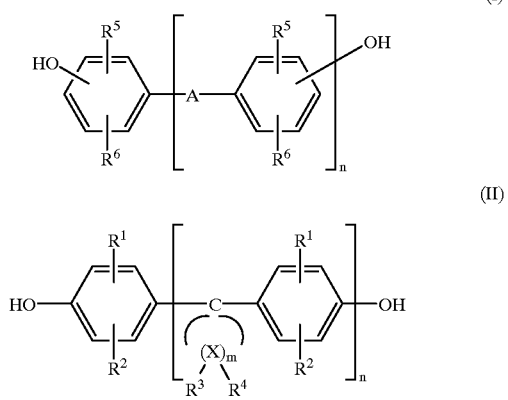

in which

A is a single bond, a $C_1$–$C_5$-alkylene, $C_2$–$C_5$-alkylidene or $C_5$–$C_6$-cycloalkylidene group, or —O—, —S—, —SO—, —SO$_2$— or —CO—, $R^5$ and $R_6$, independently, each represent hydrogen, methyl or a halogen, in particular hydrogen, methyl, chlorine or bromine, $R^1$ and $R^2$, independently, each represent hydrogen, a halogen, preferably chlorine or bromine, a $C_1$–$C_8$-alkyl group, preferably methyl or ethyl, a $C_5$–$C_6$-cycloalkyl group, preferably cyclohexyl, a $C_6$–$C_{10}$-aryl group, preferably phenyl, or a $C_7$–$C_{12}$-aralkyl group, preferably a phenyl-$C_1$–$C_4$-alkyl group, in particular benzyl, m is an integer from 4 to 7, preferably 4 or 5, n is 0 or 1, $R^3$ and $R^4$ may be individually chosen for each X and, independently, each represent hydrogen or a $C_1$–$C_6$-alkyl group and X represents a carbon atom with carbonic acid halides, preferably phosgene, and/or with aromatic dicarboxylic acid dihalides, preferably benzene dicarboxylic acid dihalides, by phase interface polycondensation or with phosgene by polycondensation in a homogeneous phase (the so-called pyridine process), wherein the molecular weight may be adjusted in a known manner by an appropriate amount of known chain stoppers.

Suitable diphenols of the formulae (I) and (II) are, for example, hydroquinone, resorcinol, 4,4'-dihydroxydiphenyl, 2,2-bis-(4-hydroxyphenyl)-propane, 2,4-bis-(4hydroxyphenyl)-2-methylbutane, 2,2-bis-(4hydroxy-3,5-dimethylphenyl)-propane, 2,2-bis-(4hydroxy-3,5-dichlorophenyl)-propane, 2,2-bis-(4-hydroxy-3,5-dibromophenyl)-propane, 1,1-bis-(4-hydroxyphenyl)-cyclohexane, 1,1-bis-(4-hydroxyphenyl)-3,3,5-trimethylcyclohexane, 1,1-bis-(4-hydroxyphenyl)-3,3-dimethylcyclohexane, 1,1-bis-(4hydroxyphenyl)-3,3,5,5-tetramethylcylcohexane or 1,1-bis-(4-hydroxyphenyl)-2,4, 4trimethylcyclopentane.

Preferred diphenols of the formula (I) are 2,2-bis-(4hydroxyphenyl)-propane and 1,1-bis-(4-hydroxyphenyl)-cyclohexane, a preferred phenol of the formula (II) is 1,1-bis-(4-hydroxyphenyl)-3,3,5-trimethylcyclohexane.

Mixtures of diphenols may also be used.

Suitable chain stoppers are, for example, phenol, p-tert.-butylphenol, long chain alkylphenols such as 4-(1,3-tetramethylbutyl)-phenol in accordance with DE-OS 2 842 005, monoalkylphenols, dialkylphenols with a total of 8 to 20 carbon atoms in the alkyl substituents in accordance with DE-OS 3 506 472, such as p-nonylphenol, 2,5-di-tert.-butylphenol, p-tert.-octylphenol, p-dodecylphenol, 2-(3,5-dimethylheptyl)-phenol and 4-(3,5-dimethylheptyl)-phenol. The amount of chain stopper required is generally 0.5 to 10 mol-%, with respect to the sum of diphenols (I) and (II).

Suitable polycarbonates or polyestercarbonates may be linear or branched; branched products are preferably obtained by incorporating 0.05 to 2.0 mol-%, with respect to the sum of diphenols used, of trifunctional or more than trifunctional compounds, e.g. those with three or more than three phenolic OH groups.

Suitable polycarbonates or polyestercarbonates may contain an aromatically bonded halogen, preferably bromine and/or chlorine; they are preferably halogen-free.

They have average molecular weights ($\overline{M}_w$, weight average), determined e.g. by ultracentrifuging or scattered light measurements, of 10,000 to 200,000, preferably 20,000 to 80,000.

Suitable thermoplastic polyesters are preferably polyalkylene terephthalates, i.e. reaction products of aromatic dicarboxylic acids or their reactive derivatives (e.g. dimethyl esters or anhydrides) and aliphatic, cycloaliphatic or arylaliphatic diols and mixtures of these types of reaction products.

Preferred polyalkylene terephthalates can be prepared from terephthalic acid (or its reactive derivatives) and aliphatic or cycloaliphatic diols with 2 to 10 carbon atoms by known methods (Kunststoff-Handbuch, vol. VIII, p. 695 et seq., Carl Hanser Verlag, Munich 1973).

In preferred polyalkylene terephthalates, 80 to 100, preferably 90 to 100 mol-% of the dicarboxylic acids groupings are terephthalic acid groupings and 80 to 100, preferably 90 to 100 mol-% of the diol groupings are ethylene glycol and/or butanediol-1,4 groupings.

Preferred polyalkylene terephthalates may contain, in addition to ethylene glycol or butanediol-1,4 groupings, 0 to 20 mol-% of groupings from other aliphatic diols with 3 to 12 carbon atoms or cycloaliphatic diols with 6 to 12 carbon atoms, e.g. groupings from propanediol-1,3, 2-ethylpropanediol-1,3, neopentyl glycol, pentanediol-1,5, hexanediol-1,6, cyclobexane-dimethanol-1,4, 3-methylpentanediol-1,3 and -1,6, 2-ethylhexanediol-1,3, 2,2-diethylpropanediol-1,3, hexanediol-2,5, 1,4-di-(β-hydroxyethoxy)-benzene, 2,2-bis-(4-hydroxycyclohexyl)-propane, 2,4-dihydroxy-1,1,3,3-tetramethylcyclobutane, 2,2-bis-(3-β-hydroxyethoxyphenyl)-propane and 2,2-bis-(4-hydroxypropoxyphenyl)-propane (DE-OS 2 407 647, 2 407 776,2 715 932).

The polyalkylene terephthalates may be branched by incorporating relatively small amounts of trihydric or tetrahydric alcohols or tribasic or tetrabasic carboxylic acids, such as are described in DE-OS 1 900 270 and U.S. Pat. No. 3,692,744. Examples of preferred branching agents are trimesic acid, trimellitic acid, trimethylolethane, trimethylolpropane and pentaerythritol. It is advisable to use not more than 1 mol-% of the branching agent, with respect to the acid component.

Polyalkylene terephthalates which have been prepared solely from terephthalic acid and its reactive derivatives (e.g. the dialkyl esters) and ethylene glycol and/or butanediol-1,4, and mixtures of these polyalkylene terephthalates are particularly preferred.

Preferred polyalkylene terephthalates are also copolyesters which are prepared from at least two of the alcohol components mentioned above; particularly preferred copolyesters are poly(ethylene glycol/butanediol-1,4) terephthalates.

Suitable polyalkylene terephthalates which are preferably used generally have an intrinsic viscosity of 0.4 to 1.5 dl/g, preferably 0.5 to 1.3 dl/g, particularly preferably 0.6 to 1.2 dl/g, each measured in phenol/o-dichlorobenzene (1:1 parts by wt.) at 25° C.

Suitable polyamides are known homopolyamides, copolyamides and mixtures of these polyamides. They may be partly crystalline and/or amorphous polyamides.

Suitable partly crystalline polyamides are polyamide-6, polyamide-6,6 and mixtures and appropriate copolymers of these components. Furthermore, suitable partly crystalline polyamides are those in which the acid component consists entirely or partly of terephthalic acid and/or isophthalic acid and/or suberic acid and/or sebacic acid and/or azelaic acid and/or adipic acid and/or cyclohexanedicarboxylic acid, in which the diamine component consists entirely or partly of m- and/or p-xylylene diamine and/or hexamethylene diamine and/or 2,2,4-trimethylhexamethylene diamine and/or 2,4,4-trimethyl-hexamethylene diamine and/or isophorone diamine and the compositions of which are known in principle.

In addition, polyamides may be mentioned which are prepared entirely or partly from lactams with 7–12 carbon atoms in the ring, optionally also using one or more of the starting components mentioned above.

Particularly preferred partly crystalline polyamides are polyamide-6 and polyamide-6,6 and mixtures of these. Known products may be used as amorphous polyamides. They are obtained by polycondensation of diamines such as ethylene diamine, hexamethylene diamine, decamethylene diamne, 2,2,4- and/or 2,4,4-trimethylhexamethylene diamine, m- and/or p-xylylene diamine, bis-(4-aminocyclohexyl)-methane, bis-(4-amino-cyclohexyl) propane, 3,3'-dimethyl-4,4'-diamino-dicyclohexylmethane, 3-aminomethyl-3,3,5-trimethylcyclohexylamine, 2,5- and/or 2,6-bis-(aminomethyl)-norbornane and/or 1,4-diaminomethylcyclohexane with dicarboxylic acids such as oxalic acid, adipic acid, azelaic acid, decanedicarboxylic acid, heptadecanedicarboxylic acid, 2,2,4- and/or 2,4,4-trimethyladipic acid, isophthalic acid and terephthalic acid.

Copolymers which are obtained by polycondensation of several monomers are also suitable, furthermore copolymers which are prepared by adding aminocarboxylic acids such as ε-aminocaproic acid, ω-aminoundecanoic acid or ω-aminolauric acid or their lactams.

Particularly suitable amorphous polyamides are polyamides prepared from isophthalic acid, hexamethylene diamine and other diamines such as 4,4'-diaminodicyclohexylmethane, isophorone diamine, 2,2,4- and/or 2,4,4-trimethylhexamethylene diamine, 2,5- and/or 2,6-bis-(aminomethyl)norbornane; or from isophthalic acid, 4,4'-diaminodicyclohexylmethane and ε-caprolactam; or from isophthalic acid, 3,3'-dimethyl-4,4'-diaminodicyclohexylmethane and lauric lactam; or from terephthalic acid and the isomeric mixture of 2,2,4- and/or 2,4,4-trimethylhexamethylene diamine.

Instead of pure 4,4'-diaminodicyclohexylmethane, mixtures of positional isomers of diaminodicylcohexylmethane may also be used, these being composed of 70 to 99 mol-% of the 4,4'-diamino isomer 1 to 30 mol-% of the 2,4'-diamino isomer 0 to 2 mol-% of the 2,2'-diamino isomer and optionally corresponding higher condensed diamines which are obtained by the hydrogenation of technical grade diaminodiphenylmethane. Up to 30% of the isophthalic acid may be replaced by terephthalic acid.

The polyamides preferably have a relative viscosity (measured in a 1 wt. % strength solution in m-cresol at 25° C.) of 2.0 to 5.0, particularly preferably 2.5 to 4.0.

Preferred moulding compositions according to the invention contain 1 to 60 parts by wt., preferably 5 to 50 parts by wt. of graft polymer component I) and 40 to 99 parts by wt., preferably 50 to 95 parts by wt. of rubber-free copolymer II).

In the event that other rubber-free thermoplastic resins which are not built up from vinyl monomers are also used, the amount of these is up to 500 parts by wt., preferably up to 400 parts by wt. and particularly preferably up to 300 parts by wt. (each with respect to 100 parts by wt. of I)+II)).

Moulding compositions according to the invention are prepared by mixing components I) and II) in conventional mixing units (preferably in multiple roll mills, mixer-extruders or internal mixers).

The invention therefore also provides a process for preparing moulding compositions according to the invention, wherein components I) and II) are mixed and then compounded and extruded at elevated temperature, generally at temperatures of 150° to 300° C.

Required and expedient additives may be added to moulding compositions according to the invention during preparation, processing, further processing and final moulding, e.g. antioxidants, UV stabilisers, peroxide decomposers, antistatic agents, lubricants, mould release agents, flame retardants, fillers or reinforcing agents (glass fibres, carbon fibres, etc.), colorants.

Final moulding may be performed on commercially available processing units and includes, for example, processing by injection moulding, sheet extruosin optionally followed by thermoforming, cold-forming, extrusion of pipes, and sections, processing by calendering.

In the following examples, the parts are always parts by weight and the percentage data is always wt. %, unless stated otherwise.

EXAMPLES

Components

ABS Graft Polymer 1 (According to the Invention)

15 parts by wt. (calculated as solids) of an anionic emulsified polybutadiene latex prepared by radical polymerisation and with a $d_{50}$ value of 183 nm and a gel content of 79 wt. %, 30 parts by wt. (calculated as solids) of an anionic emulsified polybutadiene latex prepared by radical polymerisation and with a $d_{50}$ value of 305 nm and a gel content of 55 wt. % and 15 parts by wt. (calculated as solids) of an anionic emulsified polybutadiene latex prepared by radical polymerisation and with a $d_{50}$ value of 423 nm and a gel content of 78 wt. % are brought to a solids content of about 20 wt. % with water, then the mixture is warmed to 63° C. and 0.5 parts by wt. of potassium peroxodisulfate (dissolved in water) are added. Then 40 parts by wt. of a mixture of 73 wt. % of styrene and 27 wt. % of acrylonitrile and 0.12 parts by wt. of tert.-dodecyl mercaptan are added regularly over the course of 4 hours, and in parallel with this 1 part by wt. (calculated as solid substance) of the sodium salt of a rosin acid mixture (Dresinate 731, Abieta Chemie GmbH, Gersthofen, Germany, dissolved in alkaline water) are added over a period of 4 hours. After four hours of post-reaction time, the graft latex is coagulated, following the addition of about 1.0 parts by wt. of a phenolic antioxidant, with a magnesium sulfate/acetic acid mixture and, after washing with water, the resulting powder is dried at 70° C. under vacuum.

ABS Graft Polymer 2 (According to the Invention)

17.5 parts by wt. (calculated as solids) of an anionic emulsified pdlybutadiene latex prepared by radical polymerisation and with a $d_{50}$ value of 183 nm and a gel content of 79 wt. %, 35 parts by wt. (calculated as solids) of an anionic emulsified polybutadiene latex prepared by radical polymerisation and with a $d_{50}$ value of 305 nm and a gel content of 55 wt. % and 17.5 parts by wt. (calculated as solids) of an anionic emulsified polybutadiene latex prepared by radical polymerisation and with a $d_{50}$ value of 423 nm and a gel content of 78 wt. % are brought to a solids content of about 20 wt. % with water, then the mixture is warmed to 63° C. and 0.4 parts by wt. of potassium peroxodisulfate (dissolved in water) are added. Then 30 parts by wt. of a mixture of 73 wt. % of styrene and 27 wt. % of acrylonitrile and 0.1 parts by wt. of tert.-dodecyl mercaptan are added regularly over the course of 4 hours. Further preparation was performed as described for ABS graft polymer 1.

ABS Graft Polymer 3 (According to the Invention)

17.5 parts by wt. (calculated as solids) of an anionic emulsified styrene/butadiene=10:90 copolymer prepared by radical polymerisation and with a $d_{50}$ value of 182 nm and a gel content of 71 wt. %, 30 parts by wt. (calculated as solids) of an anionic emulsified polybutadiene latex prepared by radical polymerisation and with a $d_{50}$ value of 288 nm and a gel content of 51 wt. % and 12.5 parts by wt. (calculated as solids) of an anionic emulsified polybutadiene latex prepared by radical polymerisation and with a $d_{50}$ value of 410 nm and a gel content of 75 wt. % are brought to a solids content of about 20 wt. % with water, then the mixture is warmed to 63° C. and 0.5 parts by wt. of potassium peroxodisulfate (dissolved in water) are added. Then 40 parts by wt. of a mixture of 73 wt. % of styrene and 27 wt. % of acrylonitrile and 0.12 parts by wt. of tert.dodecyl mercaptan are added regularly over the course of 4 hours. Further preparation was performed as described for ABS graft polymer 1.

ABS Graft Polymer 4 (Comparison Material, Not According to the Invention)

The procedure described under "ABS graft polymer 1" was repeated$_{50}$ wherein 60 parts by wt. (calculated as solids) of the polybutadiene latex with a $d_{50}$ value of 423 nm and a gel content of 78 wt. % were used instead of the polybutadiene latex mixture.

ABS Graft Poller 5 (Comparison Material, Not According to the Invention)

The procedure described under "ABS graft polymer 1" was repeated$_{50}$ wherein 60 parts by wt. (calculated as solids) of a polybutadiene latex with a $d_{50}$ value of 131 nm and a gel content of 88 wt. % were used instead of the polybutadiene latex mixture.

Resin Component 1

A statistical styrene/acrylonitrile copolymer (styrene:acrylonitrile ratio by weight 72:28) with a $\overline{M}_w$ of about 85,000 and $\overline{M}_w/\overline{M}_n - 1 \leq 2$ obtained by radical solution polymerisation.

Resin Component 2

A statistical styrene/acrylonitrile copolymer (styrene:acrylonitrile ratio by weight 72:28) with a $\overline{M}_w$ of about 115,000 and $\overline{M}_w/\overline{M}_n - 1 \leq 2$ obtained by radical solution polymerisation.

Moulding Compositions

The polymer components described above, in the proportions stated in table 1, 2 parts by wt. of ethylenediamine-bis-stearyl amide and 0.1 parts by wt. of a silicone oil are mixed in an internal mixer and after granulation, processed to give specimen rods and to give a flat sheet (to assess the surface).

The following data were determined:

- notched impact resistance at room temperature ($a_k^{RT}$) and at −40° C. ($a_k^{-40°\ C.}$) in accordance with ISO 180/1A (units: $kJ/m^2$),
- ball indentation hardness ($H_c$) in accordance with DIN 53456 (units: $N/mm^2$),
- thermoplastic flow characteristics (MVI) according to DIN 53735U (units: $cm^3/10$ min) and surface gloss in accordance with DIN 67530 at an angle of reflection of 20° (reflectometer value).

It can be seen from the examples (see table 2 for test data) that the moulding compositions according to the invention are characterised by a singular combination of very high toughness (at room temperature and low temperature), very high ball indentation hardness, very easy processability and very good gloss values. The variability in the ABS properties when using a single graft polymer is extremely high (see e.g. approximate doubling of the toughness value by raising the rubber content from. 15 wt. % to 22 wt. % while retaining the same resin matrix).

TABLE 1

Composition of moulding compositions

| Example | ABS graft polymer 1 (pts. by wt.) | ABS graft polymer 2 (pts. by wt.) | ABS graft polymer 3 (pts. by wt.) | ABS graft polymer 4 (pts. by wt.) | ABS graft polymer 5 (pts. by wt.) | Resin component 1 (pts. by wt.) | Resin component 2 (pts. by wt.) |
|---|---|---|---|---|---|---|---|
| 1 | 25 | — | — | — | — | 75 | — |
| 2 | 30 | — | — | — | — | 70 | — |
| 3 | 36.7 | — | — | — | — | 63.3 | — |
| 4 | — | 21.43 | — | — | — | 78.57 | — |
| 5 | — | 25.72 | — | — | — | 74.28 | — |
| 6 | — | 31.43 | — | — | — | 68.57 | — |
| 7 | — | — | 30 | — | — | 70 | — |
| 8 | 36.7 | — | — | — | — | — | 63.3 |
| 9 | — | 31.43 | — | — | — | — | 68.57 |
| 10 | — | — | 36.7 | — | — | — | 63.3 |
| 11 (comp.) | — | — | — | 12.5 | 12.5 | 75 | — |
| 12 (comp.) | — | — | — | 15 | 15 | 70 | — |
| 13 (comp.) | — | — | — | 18.35 | 18.35 | 63.3 | — |
| 14 (comp.) | — | — | — | 36.7 | — | — | 63.3 |

TABLE 2

Test data for moulding compositions

| Example | RT $a_k$ (kJ/m²) | −40° C. $a_k$ (kJ/m²) | $H_C$ (N/mm²) | MVI (cm³/10 min) | Degree of gloss |
|---|---|---|---|---|---|
| 1 | 18.3 | 9.0 | 118 | 40.6 | 94 |
| 2 | 24.4 | 12.1 | 108 | 32.4 | 93 |
| 3 | 32.5 | 23.4 | 95 | 27.2 | 91 |
| 4 | 17.3 | 9.2 | 116 | 40.7 | 95 |
| 5 | 24.2 | 12.2 | 105 | 34.4 | 94 |
| 6 | 29.7 | 23.0 | 93 | 28.6 | 93 |
| 7 | 24.5 | 11.9 | 109 | 35.3 | 93 |
| 8 | 36.5 | 24.7 | 90 | 8.7 | 92 |
| 9 | 36.2 | 26.1 | 89 | 8.4 | 92 |
| 10 | 36.6 | 23.5 | 91 | 8.9 | 91 |
| 11 (comp.) | 17.2 | 8.8 | 113 | 36.5 | 94 |
| 12 (comp.) | 22.8 | 9.1 | 102 | 31.1 | 92 |
| 13 (comp.) | 27.3 | 14.6 | 91 | 23.4 | 91 |
| 14 (comp.) | 33.1 | 19.7 | 85 | 8.2 | 92 |

What is claimed is:

1. Moulding compositions containing

I) a graft rubber polymer which is obtainable by emulsion polymerisation of styrene and acrylonitrile in the ratio by weight of 90:10 to 50:50, wherein styrene and/or acrylonitrile may be entirely or partly replaced by α-methylstyrene, methyl methacrylate or N-phenylmaleic imide, in the presence of a mixture of a butadiene polymer latex (A) with an average particle diameter $d_{50} \leq 230$ nm and a gel content of 40 to 95 wt. %, a butadiene polymer latex (B) with an average particle diameter $d_{50}$ of 250 to 330 nm and a gel content of 35 to 75 wt. % and a butadiene polymer latex (C) with an average particle diameter $d_{50} \geq 350$ nm and a gel content of 60 to 90 wt. %, wherein the butadiene polymer latices each contain 0 to 50 wt. % of another copolymerised vinyl monomer and wherein the ratio by weight of the graft monomers used to the butadiene polymers used is 10:90 to 60:40, and II) at least one rubber-free copolymer of styrene and acrylonitrile in the ratio by weight of 90:10 to 50:50, wherein styrene and/or acrylonitrile may be entirely or partly replaced by α-methylstyrene, methyl methacrylate or N-phenylmaleic imide.

2. Moulding compositions containing

I) a graft rubber polymer which is obtainable by emulsion polymerisation of styrene and acrylonitrile in the ratio by weight of 90:10 to 50:50, wherein styrene and/or acrylonitrile may be entirely or partly replaced by α-methylstyrene, methyl methacrylate or N-phenylmaleic imide, in the presence of a mixture of a butadiene polymer latex (A) with an average particle diameter of 150 to 220 nm and a gel content of 50 to 90 wt. %, a butadiene polymer latex (B) with an average particle diameter $d_{50}$ of 260 to 320 nm and a gel content of 40 to 70 wt. % and a butadiene polymer latex (C) with an average particle diameter $d_{50}$ of 370 to 450 nm and a gel content of 65 to 85 wt. %, wherein the butadiene polymer latices each contain 0 to 50 wt. % of another copolymerised vinyl monomer and wherein the ratio by weight of the graft monomers used to the butadiene polymers used is 20:80 to 50:50, and II) at least one rubber-free copolymer of styrene and acrylonitrile in the ratio by weight of 90:10 to 50:50, wherein styrene and/or acrylonitrile may be entirely or partly replaced by α-methylstyrene, methyl methacrylate or N-phenylmaleic imide.

3. Moulding compositions according to claim 1, wherein butadiene polymer latex A) is used in an amount of 10 to 40 wt. %, B) in an amount of 10 to 70 wt. % and C) in an amount of 5 to 50 wt. % (each with respect to the particular solids content of the latices).

4. Moulding compositions according to claim 1, wherein up to 50 wt. % of the butadiene polymer contains, apart from butadiene, comonomers chosen from the group isoprene, chloroprene, acrylonitrile, styrene, α-methylstyrene, $C_1$–$C_4$-alkylstyrenes, $C_1$–$C_8$-alkyl acrylates, $C_1$–$C_8$-alkyl methacrylates, alkylene glycol diacrylates, alkylene glycol dimethacrylates, divinyl benzene or mixtures of these.

5. Thermoplastic moulding compositions according to claim 1 also containing at least one resin selected from an aromatic polycarbonate, an aromatic polyestercarbonate, a polyester, a polyamide or mixtures thereof.

6. A process for preparing moulding compositions according to claim 1, wherein components I) and II) are mixed and then compounded and extruded at elevated temperature.

7. A method of using the thermoplastic molding composition of claim 1 comprising molding an article therefrom.

8. The molded article made by the method of claim 7.

* * * * *